US010268650B2

(12) United States Patent
Ball et al.

(10) Patent No.: US 10,268,650 B2
(45) Date of Patent: Apr. 23, 2019

(54) SYSTEMS AND METHODS FOR PROVIDING COMMUNICATIONS TO AND FROM VERIFIED ENTITIES

(71) Applicant: Facebook, Inc., Menlo Park, CA (US)

(72) Inventors: Allison Elaine Ball, Austin, TX (US); Andrew Yaoshu Song, San Francisco, CA (US)

(73) Assignee: Facebook, Inc., Menlo Park, CA (US)

( * ) Notice: Subject to any disclaimer, the term of this patent is extended or adjusted under 35 U.S.C. 154(b) by 467 days.

(21) Appl. No.: 14/466,879

(22) Filed: Aug. 22, 2014

(65) Prior Publication Data
US 2016/0055247 A1 Feb. 25, 2016

(51) Int. Cl.
G06F 17/30 (2006.01)
G06F 16/9535 (2019.01)
G06Q 50/00 (2012.01)

(52) U.S. Cl.
CPC ......... G06F 16/9535 (2019.01); G06Q 50/01 (2013.01)

(58) Field of Classification Search
CPC .................................................. G06F 17/30867
USPC ........................................................ 707/732
See application file for complete search history.

(56) References Cited

U.S. PATENT DOCUMENTS

| 7,904,328 | B2 * | 3/2011 | Sciuk | G06Q 10/1053 705/7.38 |
| 8,515,888 | B2 * | 8/2013 | Ventilla | G06Q 10/10 706/45 |
| 8,935,192 | B1 * | 1/2015 | Ventilla | G06N 5/04 706/45 |
| 9,105,044 | B2 * | 8/2015 | Wu | G06Q 30/0231 |
| 9,590,969 | B2 * | 3/2017 | Reno | H04L 63/08 |
| 2004/0123162 | A1 * | 6/2004 | Antell | H04L 63/08 726/5 |
| 2006/0248021 | A1 * | 11/2006 | Jain | G06Q 10/10 705/75 |
| 2007/0214032 | A1 * | 9/2007 | Sciuk | G06Q 10/1053 705/7.29 |
| 2010/0268716 | A1 * | 10/2010 | Degaugue | G06F 17/30731 707/741 |
| 2011/0067094 | A1 * | 3/2011 | Antell | H04L 63/08 726/7 |
| 2011/0106746 | A1 * | 5/2011 | Ventilla | G06Q 10/10 706/50 |
| 2011/0106895 | A1 * | 5/2011 | Ventilla | G06Q 10/10 709/206 |
| 2013/0013553 | A1 * | 1/2013 | Stibel | G06Q 10/107 707/602 |
| 2013/0013927 | A1 * | 1/2013 | Stibel | G06Q 10/107 713/172 |
| 2013/0172693 | A1 * | 7/2013 | Ohana Lubelchick | G09B 19/00 600/301 |

(Continued)

Primary Examiner — Jean M Corrielus
(74) Attorney, Agent, or Firm — Sheppard Mullin Richter & Hampton LLP

(57) ABSTRACT

Systems, methods, and non-transitory computer-readable media can identify a verified entity who is verified based on a verification process. A set of questions directed to the verified entity can be received from a set of question providers. The set of questions can be ranked based on question ranking criteria. At least one response to at least one question in the set of questions can be received from the verified entity. Access to the at least one response can be provided.

18 Claims, 10 Drawing Sheets

(56) References Cited

U.S. PATENT DOCUMENTS

| | | | | |
|---|---|---|---|---|
| 2013/0173725 | A1* | 7/2013 | Ventilla | G06Q 10/10 709/206 |
| 2013/0317808 | A1* | 11/2013 | Kruel | H04L 51/32 704/9 |
| 2013/0339141 | A1* | 12/2013 | Stibel | G06Q 30/0207 705/14.49 |
| 2014/0156365 | A1* | 6/2014 | Porter | G06Q 10/10 705/14.11 |
| 2014/0156406 | A1* | 6/2014 | Kim | G06Q 30/02 705/14.56 |
| 2014/0245186 | A1* | 8/2014 | Tseng | H04N 21/26291 715/753 |
| 2014/0282930 | A1* | 9/2014 | Markwordt | G06Q 20/4014 726/5 |
| 2014/0289034 | A1* | 9/2014 | Wu | G06Q 30/0231 705/14.31 |
| 2015/0264023 | A1* | 9/2015 | Reno | G06F 21/316 726/7 |
| 2015/0339590 | A1* | 11/2015 | Maarek | G06F 17/30477 706/12 |
| 2016/0132973 | A1* | 5/2016 | Wu | G06Q 30/0231 463/42 |

* cited by examiner

700

702

User B asked you:

Do you like chocolate or vanilla ice cream?

There are 12 similar questions from User D, User E, and 10 others. ← 704

706

Write a response...

Submit - Skip ← 708

FIGURE 7

SYSTEMS AND METHODS FOR PROVIDING COMMUNICATIONS TO AND FROM VERIFIED ENTITIES

FIELD OF THE INVENTION

The present technology relates to the field of communications. More particularly, the present technology relates to techniques for providing communications to and from verified entities.

BACKGROUND

Today, people utilize computing devices (or systems) for various purposes. Users can use their computing devices to interact with one another, access content, share content, and create content. A user can utilize his or her computing device to interact with a social networking system (or service), such as by providing, viewing, or otherwise accessing information through the social networking system. In some cases, the social networking system can provide an interface or medium for users of the social networking system to communicate with one another.

In one example, a user may desire to ask a public figure a question and receive an answer from the public figure. Under conventional approaches, the user may have to search for the public figure's correct contact information in order to contact the public figure. Often times, the public figure does not respond with an answer. Under conventional approaches, the user can also search for previous interviews, biographies, and/or articles associated with the public figure in hopes of finding the same or a similar question, as well as an answer from the public figure. However, under such conventional approaches, the same or similar question may not necessarily have been presented to the public figure. Moreover, under conventional approaches, interviews, biographies, and/or articles relating to the public figure may present the public figure with questions in which the user has little or no interest. Due to these and other concerns, conventional approaches can create challenges for or reduce the overall user experience associated with communicating with public figures.

SUMMARY

Various embodiments of the present disclosure can include systems, methods, and non-transitory computer readable media configured to identify a verified entity who is verified based on a verification process. A set of questions directed to the verified entity can be received from a set of question providers. The set of questions can be ranked based on question ranking criteria. At least one response to at least one question in the set of questions can be received from the verified entity. Access to the at least one response can be provided.

In an embodiment, the ranking of the set of questions based on the question ranking criteria can further comprise acquiring a property for each respective question provider in the set of question providers. In some cases, the property can indicate at least one of a reputation metric of the respective question provider or a verified entity status of the respective question provider. A rank for a respective question, in the set of questions, received from the respective question provider can be increased when at least one of the reputation metric satisfies a specified reputation threshold level or the verified entity status indicates that the respective question provider is verified based on the verification process.

In an embodiment, the ranking of the set of questions based on the question ranking criteria can further comprise acquiring a popularity metric for each respective question in the set of questions. A rank for the respective question can be increased when the popularity metric satisfies a specified popularity threshold level.

In an embodiment, the popularity metric can be based on at least one of an amount of likes for the respective question, an amount of up-votes for the respective question, an amount of shares for the respective question, an amount of hides for the respective question, or an amount of down-votes for the respective question.

In an embodiment, the ranking of the set of questions based on the question ranking criteria can further comprise acquiring time data associated with each respective question in the set of questions. A rank for the respective question can be increased when the time data associated with the respective question indicates that the respective question is received within an allowable time frame.

In an embodiment, the at least one response from the verified entity can be received as part of a set of responses. In some instances, the set of responses can be ranked.

In an embodiment, the ranking of the set of questions based on the question ranking criteria can include boosting a rank for a particular question in the set of questions over at least one other question in the set. The rank for the particular question can be boosted when the particular question is received from a particular question provider who is verified based on the verification process and the at least one other question is received from a non-verified question provider. In some cases, a rank for the at least one response from the verified entity can be boosted over at least one other response from a non-verified responder.

In an embodiment, at least one of the set of questions or the at least one response can be presented to a viewing user. The ranking of the set of questions based on the question ranking criteria can be personalized for the viewing user using social graph data associated with the viewing user.

In an embodiment, a real-time question-and-answer session can be initiated prior to the receiving of the set of questions. The set of questions and the at least one response can be presentable in association with the question-and-answer session.

In an embodiment, a presentation of the set of questions and the at least one response can persist over time.

In an embodiment, the question-and-answer session can correspond to at least one of a story within a social networking system or a post within the social networking system.

In an embodiment, the question-and-answer session can be initiated by at least one of a host or the verified entity.

In an embodiment, the ranking of the set of questions based on the question ranking criteria can include boosting a rank for a particular question in the set of questions over at least one other question in the set when the particular question is received from the host and the at least one other question is received from a non-host question provider.

In an embodiment, an indication that another verified entity is available can be received from the verified entity. One or more questions directed to the other verified entity can be received. One or more responses to the one or more questions can be received from the other verified entity.

In an embodiment, the verified entity can be associated with at least one of a public figure, a brand, a company, or an organization.

In an embodiment, a subset of questions, out of the set of questions, can be provided to the verified entity subsequent to the ranking of the set of questions. In some instances, each question in the subset can satisfy a specified ranking threshold level. In some cases, the subset can include the at least one question.

In an embodiment, the receiving of the set of questions can occur asynchronously from the receiving of the at least one response.

In an embodiment, a first question in the set of questions can be determined to be within a similarity threshold deviation with respect to a second question in the set of questions. In some instances, a single question representative of the first question and the second question can be provided to the verified entity.

Many other features and embodiments of the invention will be apparent from the accompanying drawings and from the following detailed description.

BRIEF DESCRIPTION OF THE DRAWINGS

FIG. 7 illustrates an example screenshot associated with providing communications to and from verified entities, according to an embodiment of the present disclosure.

Figure 1:
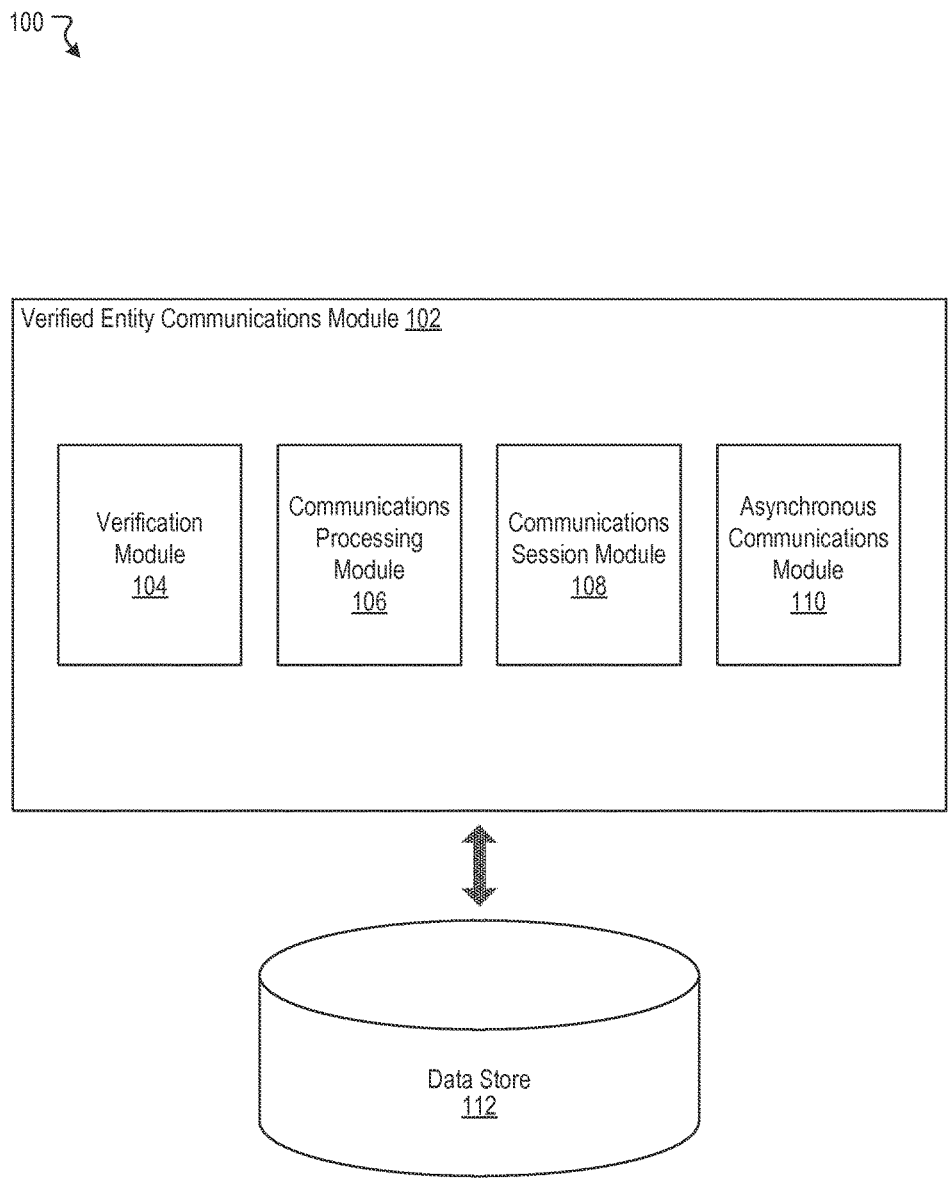
FIG. 1 illustrates an example system including an example verified entity communications module configured to facilitate providing communications to and from verified entities, according to an embodiment of the present disclosure.

The figures depict various embodiments of the disclosed technology for purposes of illustration only, wherein the figures use like reference numerals to identify like elements. One skilled in the art will readily recognize from the following discussion that alternative embodiments of the structures and methods illustrated in the figures can be employed without departing from the principles of the disclosed technology described herein.

DETAILED DESCRIPTION

Providing Communications to and from Verified Entities

People use social networking systems (or services) for a wide variety of purposes. Users of a social networking system can utilize their computing devices (or systems) to establish connections, communicate, and interact with one another via the social networking system. Users of the social networking system can also create, access, and share various types of content. The social networking system can provide an interface or medium through which news, messages, and information are transmitted.

In some cases, users may desire to communicate with a public figure, such as a politician, celebrity, or company representative. In one example, a user may wish to ask the public figure a question and receive an answer from the public figure. In accordance with conventional approaches, a user may attempt to communicate with the public figure directly. However, often times the public figure may not receive the communication from the user and/or may not respond even if the communication was received. Furthermore, the user can face challenges when searching for the public figure's contact information. For example, imposters of the public figure may provide fake contact information. In addition, under conventional approaches, the user may also search for existing information about the public figure in attempt to find an answer to the user's question. However, such searching can be tedious, ineffective, and/or inefficient.

Therefore, an improved approach to communicating with public figures can be beneficial for addressing or alleviating various concerns associated with conventional approaches. Various embodiments of the present disclosure can, for example, identify a verified entity, such as a public figure who has been verified based on a verification process to actually be the public figure. A set of questions directed to the verified entity can be received from a set of question providers, such as users of the social networking system. The set of questions can be ranked based on question ranking criteria. For example, the question ranking criteria can specify that questions in the set that are most popular or most relevant to a viewing user are to be ranked higher than other questions in the set. At least one response to at least one question in the set of questions can be received from the verified entity. Access to the at least one response can be provided. In one example, the at least one response and the at least one question can be displayed to the viewing user.

FIG. 1 illustrates an example system 100 including an example verified entity communications module 102 configured to facilitate providing communications to and from verified entities, according to an embodiment of the present disclosure. In some embodiments, the example verified entity communications module 102 can include a verification module 104, a communications processing module 106, a communications session module 108, and an asynchronous communications module 110. The example system 100 can also include at least one data store 112.

The at least one data store 112 can be configured to store and maintain various types of data. In some implementations, the at least one data store 112 can store information associated with a social networking system (or service), such as the social networking system 930 of FIG. 9. The information associated with the social networking system can include data about users, social connections, social interactions, locations, maps, places, events, groups, posts, media, communications, and various other types of data. As shown in the example system 100, the verified entity communications module 102 can be configured to operate with the at least one data store 112.

In some embodiments, the verification module 104 of the verified entity communications module 102 can be configured to identify a verified entity who is verified based on a verification process. In some instances, the verified entity can be associated with at least one of a public figure, a brand, a company, or an organization. The verified entity can correspond to an official representation or an official account, at the social networking system, for a real-world public figure, brand, company, or organization. In one example, the verified entity can correspond to a public figure who has been verified based on the verification process. In some instances, the verification process can including communicating with a representative or agent of the public figure to confirm the identity of the public figure. It should be understood that many variations are possible.

The communications processing module 106 can be configured to process or otherwise handle one or more communications provided to and/or from the verified entity. In some embodiments, the communications processing module 106 can receive from a set of question providers a set of questions directed to the verified entity, rank the set of questions based on question ranking criteria, receive from the verified entity at least one response to at least one question in the set of questions, and provide access to the at least one response. More details regarding the communications processing module 106 will be provided below with reference to FIG. 2.

In some implementations, the verified entity communications module 102 can include both the communications session module 108 and the asynchronous communications module 110. However, it is contemplated that in some cases, the verified entity communications module 102 can include the communications sessions module 108, while the asynchronous communications module 110 can be optionally included. It is also contemplated that in some instances, the verified entity communications module 102 can include the asynchronous communications module 110, while the communications sessions module 108 can be optionally included.

The communications sessions module 108 can be configured to initiate a real-time question-and-answer (Q&A) session. The real-time question-and-answer session can correspond to a live event occurring at the social networking system during which the verified entity receives questions from question providers and provides responses or answers to the questions. For example, a verified entity may wish to initiate a question-and-answer session, which can be facilitated by the communications sessions module 108. In another example, a host may wish to initiate a question-and-answer session with the verified entity, which can be facilitated by the communications sessions module 108. In some cases, any user of the social networking system can access or view the questions and responses in the session. In some instances, only invited users can access the questions and responses.

In some embodiments, the question-and-answer session can correspond to a story and/or post within the social networking system. Similar to other posts (and/or stories), users who have access to the question-and-answer post can like, share, and/or otherwise interact with the post. In some implementations, a user or question provider can submit a question to the verified entity in the form of a comment to the question-and-answer post. The verified entity can respond to or answer the question in the form of a reply to the comment. In some cases, the comments and responses can also be liked, supported, and/or up-voted, etc., by various users.

Furthermore, the questions (e.g., in the form of comments) and responses (e.g., in the form of comment replies) can be presented in association with the question-and-answer session. For example, the questions and responses can be displayed below the question-and-answer post. In some embodiments, a presentation of the questions and responses can persist over time. For example, the verified entity or the host can indicate that the question-and-answer session has ended. At the end of the session, the order in which the questions and responses are presented can remain substantially the same, such that time decay does not factor into the presentation of the questions and responses. In some cases, the order can remain substantially the same for each particular viewing user.

Moreover, the asynchronous communications module 110 can be configured to provide asynchronous communications to and/or from the verified entity. The asynchronous communications module 110 can enable questions from question providers to be received asynchronously relative to responses being received from the verified entity. For example, question providers can submit questions to the verified entity at their convenience, and the verified entity can provide responses at a time of his or her choosing.

In some implementations, the asynchronous communications module 110 can be configured to determine that a first question from a first question provider is substantially the same as, or within a similarity threshold deviation with respect to, a second question from a second question provider. In some cases, this can be achieved based on topic tagging, text analysis, etc., applied to the first and second questions. As a result, the asynchronous communications module 110 can provide, to the verified entity, a single question representative of the first question and the second question. In some implementations, the asynchronous communications module 110 can indicate to the verified user that there are other questions similar to the single representative question.

Figure 2:
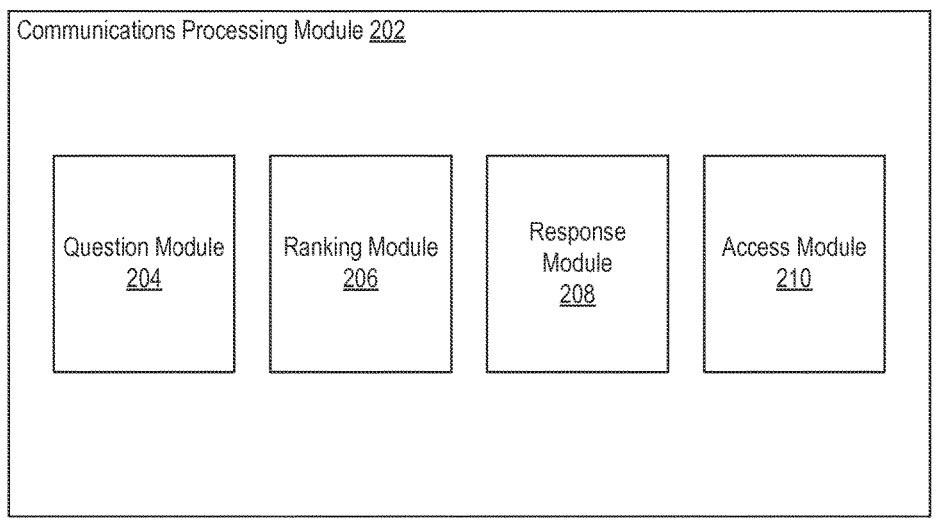
FIG. 2 illustrates an example communications processing module configured to facilitate providing communications to and from verified entities, according to an embodiment of the present disclosure.

FIG. 2 illustrates an example communications processing module 202 configured to facilitate providing communications to and from verified entities, according to an embodiment of the present disclosure. In some embodiments, the communications processing module 106 of FIG. 1 can be implemented as the communications processing module 202. As shown, the communications processing module 202 can include a question module 204, a ranking module 206, a response module 208, and an access module 210.

The communications processing module 202 can be configured to process and/or handle various tasks and operations associated with communicating among users, such as between question providers and a verified entity. In some embodiments, the question module 204 can be configured to receive from a set of question providers a set of questions directed to a verified entity. In one example, the set of question providers can be users of a social networking system who are accessing or participating in a question-and-answer session involving the verified entity. The question providers can provide the set of questions during the session. The set of questions can be received by the question module 204 during the session, in a manner similar to receiving comments for a post. In another example, the set of question providers can provide the set of questions at various times. A first question provider can, for example, provide a first question at a first time frame, while a second question provider can provide a second question at a second time frame significantly different from the first time frame. The question module 204 can receive the set of questions, including the first question and the second question.

The ranking module 206 can be configured to rank the set of questions based on question ranking criteria. A more detailed discussion of the ranking module 206 will be provided below with reference to FIG. 3.

The response module 208 can be configured to receive from the verified entity at least one response to at least one question in the set of questions. In one example, the at least one response can be received by the response module 208 from the verified entity during a question-and-answer session. In another example, the at least one response can be received by the response module 208 at a time when the verified entity decides to provide the at least one response.

The access module 210 can be configured to provide access to the at least one response. For example, the access module 210 can display the at least one response to an audience, which can include the set of question providers, the verified entity, and other viewing users. In some cases, the set of questions (or a subset thereof) can be provided along with the at least one response.

Figure 3:
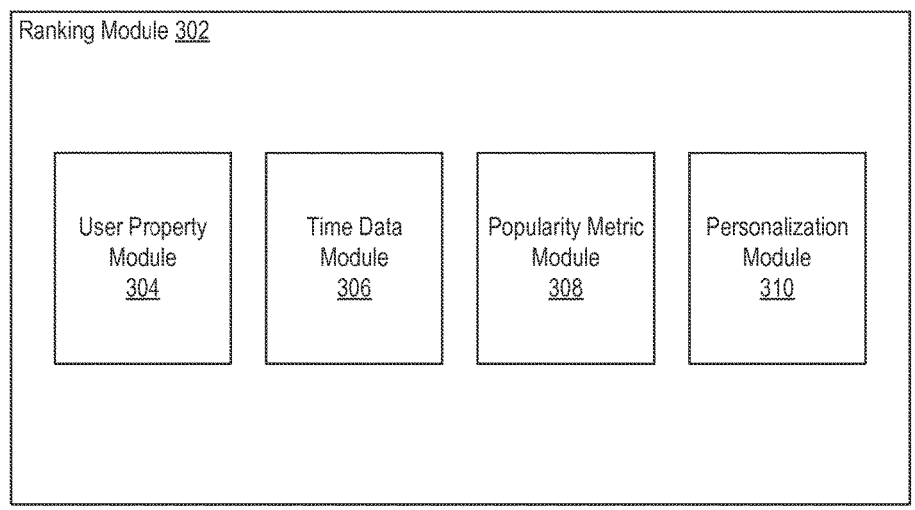
FIG. 3 illustrates an example ranking module configured to facilitate providing communications to and from verified entities, according to an embodiment of the present disclosure.

FIG. 3 illustrates an example ranking module 302 configured to facilitate providing communications to and from verified entities, according to an embodiment of the present disclosure. In some embodiments, the ranking module 206 of FIG. 2 can be implemented as the ranking module 302. As shown in the example of FIG. 3, the ranking module 302 can include a user property module 304, a time data module 306, a popularity metric module 308, and a personalization module 310.

As discussed, the ranking module 302 can be configured to facilitate ranking a set of questions, received from a set of question providers, based on question ranking criteria. The question ranking criteria can dictate how questions in the set of questions are to be ranked. In some embodiments, one or more criteria of the question ranking criteria can cause the questions in the set to be ranked based on user properties. The user property module 304 can be configured to acquire a property for each respective question provider in the set of question providers.

In some instances, the property can indicate a reputation metric of the respective question provider. The reputation metric can correspond to a score representing how well or poorly the respective question provider "behaves" online, how many other users like or dislike the respective question provider, and/or how much social influence the respective question provider has, etc. In one example, if the respective question provider publishes many posts that are liked or up-voted by other users, then the respective question provider can have a higher reputation metric or score. In another example, if the respective question provider harasses other users and/or engages in fraudulent activities, then the reputation metric or score for the respective question provider can be lower. A question received from the respective question provider can be ranked higher when the respective question provider has a higher reputation metric. It follows that a question received from the respective question provider can be ranked lower when the respective question provider has a lower reputation metric In some cases, the property can indicate a verified entity status of the respective question provider. The verified entity status can specify whether or not the respective question provider is a verified entity. As discussed previously, a user can undergo a verification process to become a verified entity. When the respective question provider is a verified entity, a rank for a question from the respective question provider can be higher than a rank for a question from a non-verified question provider. In one example, the respective question provider can be a second verified entity who provides a question directed to a first verified entity. The question received from the second verified entity can be ranked higher than a question received from a non-verified question provider.

In some instances, a host can initiate a question-and-answer session, as discussed previously. The ranking of the set of questions based on the question ranking criteria can include boosting a rank for a particular question in the set of questions over at least one other question in the set when the particular question is received from the host and the at least one other question is received from a non-host question provider.

In some embodiments, the ranking module 302 can increase a rank for a respective question, in the set of questions, received from the respective question provider when the reputation metric of the respective question provider satisfies a specified reputation threshold level and/or when the verified entity status of the respective question provider indicates that the respective question provider is verified based on the verification process. For example, if the reputation metric is at least 80% "good" for the respective question provider and/or if the respective question provider is a verified entity, then the respective question of the respective question provider can be ranked higher. Many other variations are possible.

Moreover, in some implementations, one or more criteria of the question ranking criteria can cause the questions in the set to be ranked based on time data. The time data module 306 can be configured to acquire time data associated with each respective question in the set of questions. The time data can associated with each respective question can specify, for example, when the respective question is provided and/or received. In some implementations, the ranking module 302 can increase a rank for the respective question when the time data associated with the respective question indicates that the respective question is received within an allowable time frame. In some cases, questions that are received at a more recent time frame can be ranked higher than questions received at a prior time frame. For example, questions that are received within the most recent minute can be ranked higher than questions received at a time prior to the most recent minute.

Furthermore, in some embodiments, one or more criteria of the question ranking criteria can cause the questions in the set to be ranked based on popularity metrics. The popularity metric module 308 can be configured to acquire a popularity metric for each respective question in the set of questions. The ranking module 302 can increase a rank for the respective question when the popularity metric satisfies a specified popularity threshold level. In some instances, the popularity metric can be based on at least one of an amount of likes for the respective question, an amount of up-votes for the respective question, an amount of shares for the respective question, an amount of hides for the respective question, or an amount of down-votes for the respective question. In one example, the rank for the respective question can be increased when the respective question receives at least 20 likes and at least an 80% ratio of likes to likes and hides. In another example, the rank for the respective question can be increased when the respective question receives at least 100 likes or at least an 90% of likes to likes and hides. Many variations are possible.

In some implementations, a subset of questions, out of the set of questions, can be provided to the verified entity subsequent to the ranking of the set of questions. Each question in the subset can satisfy a specified ranking threshold level and the subset can include the at least one question to which the at least one response is directed. For example, a subset of the three highest ranked questions can be provided to the verified entity. The verified entity can respond to one or more of the three highest ranked questions.

In addition, in some cases, a set of responses can be received for the set of questions. For example, the at least one response can be included as part of the set of responses. In some embodiments, the ranking module 302 can be configured to rank the set of responses. For example, a rank for the at least one response, in the set of response, from the verified entity can be boosted over at least one other response from a non-verified responder.

In some instances, at least one of the set of questions or the at least one response can be presented to a viewing user. In some implementations, the personalization module 310 can be configured to acquire social graph data associated with the viewing user. As such, one or more criteria of the question ranking criteria can cause the ranking of the questions in the set to be personalized for the viewing user. The ranking module 302 can personalize the ranking of the questions for the viewing user using the social graph data associated with the viewing user. For example, questions and/or responses from social connections (e.g., friends) of the viewing user can be ranked and presented to the viewing user in higher priority than at least some questions and/or responses from users who are not, or less, socially connected with the viewing user.

As set forth herein, questions and/or responses can be ranked higher or ranked lower based on ranking criteria associated with such factors as user properties, time data, popularity metrics, and personalization. In some embodiments, a higher ranking can mean an attendant increase in the ranking of the question/response from an initial (or default) ranking of the question/response. Likewise, in some embodiments, a lower ranking for a question/response can mean an attendant decrease in the ranking of the question/response from an initial ranking of the question/response.

Figure 4:
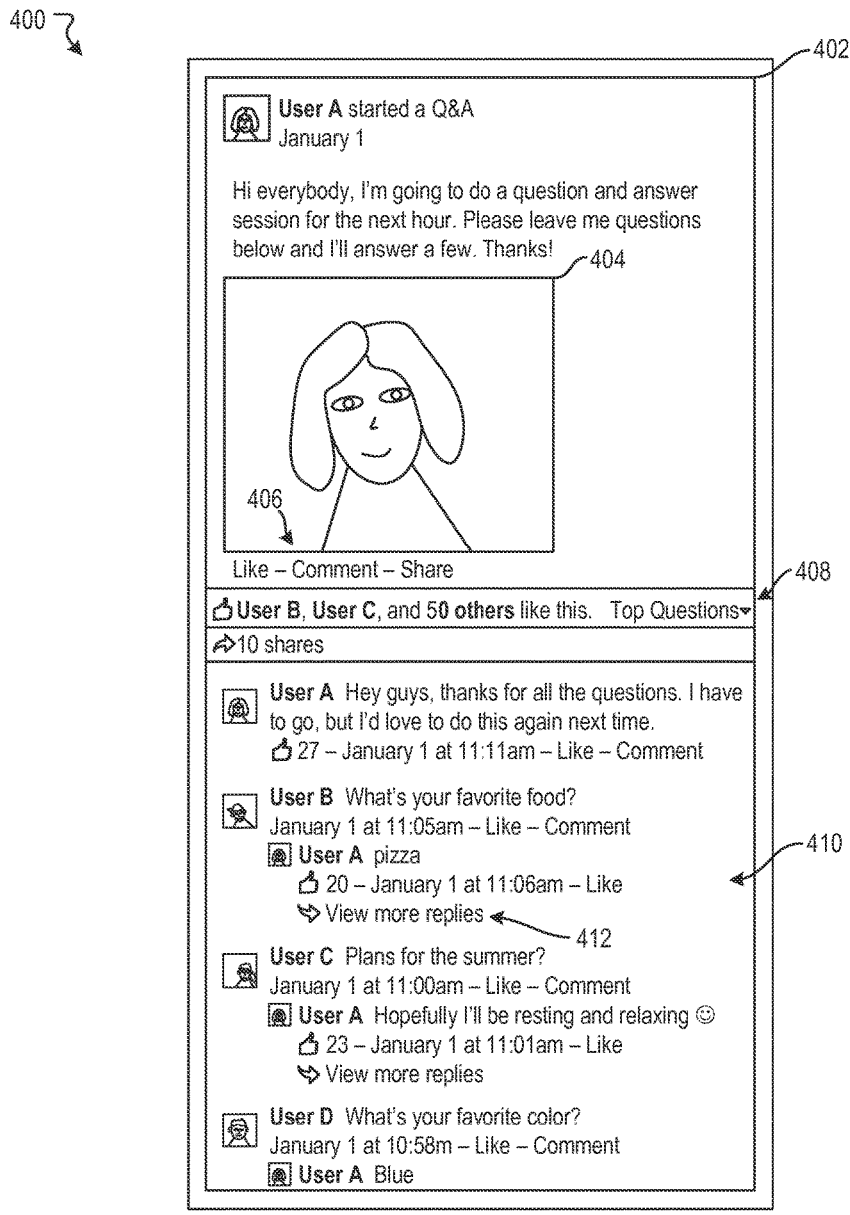
FIG. 4 illustrates an example screenshot associated with providing communications to and from verified entities, according to an embodiment of the present disclosure.

FIG. 4 illustrates an example screenshot 400 associated with providing communications to and from verified entities, according to an embodiment of the present disclosure. The example screenshot 400 can show an interface 402 for an example question-and-answer (Q&A) session. In the example of FIG. 4, the question-and-answer session can be initiated by User A, who can be a verified entity.

The example question-and-answer session can correspond to a story or post within a social networking system. As shown, a media file such as an image 404 can be posted with the session. In some embodiments, the session can be accessible to various users in the social networking system. Users who can access the session can interact with the post, such as via engagement elements 406 (e.g., Like, Comment, Share, etc.).

In some embodiments, a user viewing the session can filter or select how questions and responses are to be provided, presented, and/or displayed. In the example of FIG. 4, a viewing user can select "Top Questions" 408, such that the highest ranked questions and responses 410 can be provided to the viewing user.

In some implementations, some responses can be consolidated, condensed, or hidden. The viewing user can cause these responses to be shown by clicking or tapping on the "View more replies" element 412. Although not illustrated, in some cases, questions can also be consolidated, condensed, or hidden, and then shown in response to a user command or interaction.

In some embodiments, the verified entity User A can end the session. A comment from User A thanking everyone can be ranked and provided in the highest priority (e.g., displayed at the top), to indicate that the session has ended.

Figure 5:
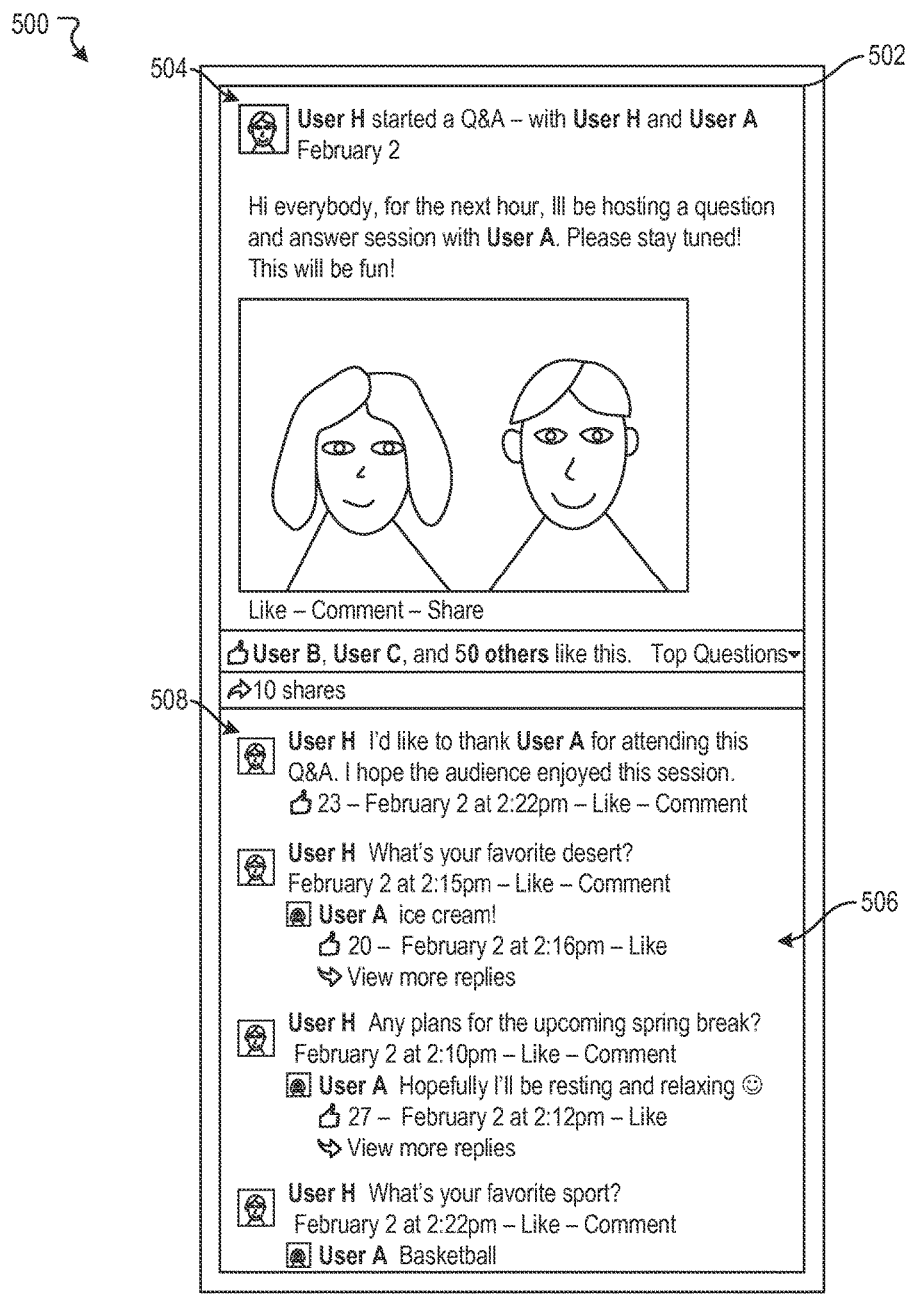
FIG. 5 illustrates an example screenshot associated with providing communications to and from verified entities, according to an embodiment of the present disclosure.

FIG. 5 illustrates an example screenshot 500 associated with providing communications to and from verified entities, according to an embodiment of the present disclosure. The example screenshot 500 can show an interface 502 for an example question-and-answer (Q&A) session. In the example of FIG. 5, the question-and-answer session can be initiated by a host, such as User H 504, and can involve a verified entity, such as User A.

In the example of FIG. 5, questions that are received from the host (User H) during the session can be ranked higher than questions received from non-host question providers. As such, a viewing user who is viewing "Top Questions" can be presented with questions 506 from User H in priority over other questions.

In some implementations, the host User H can end the session. A comment from User H thanking everyone can be ranked and provided in the highest priority (e.g., displayed at the top), to indicate that the session has ended.

Figure 6:
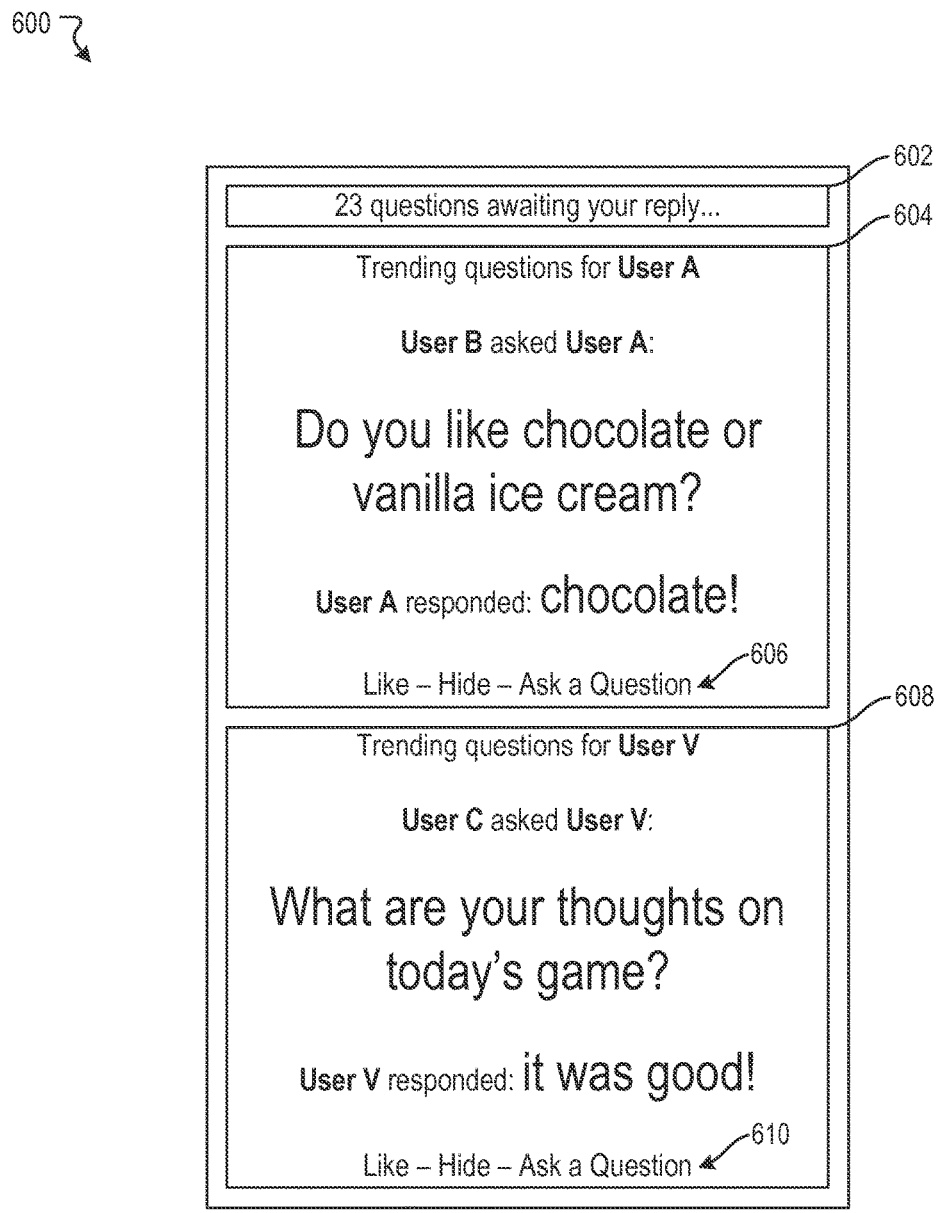
FIG. 6 illustrates an example screenshot associated with providing communications to and from verified entities, according to an embodiment of the present disclosure.

FIG. 6 illustrates an example screenshot 600 associated with providing communications to and from verified entities, according to an embodiment of the present disclosure. The screenshot can include an example interface for asynchronous communications with verified entities. In some implementations, the interface can be accessed via an application and/or a social networking system (or service). In some embodiments, when a verified entity accesses the example interface, an element 602 for indicating an amount of available questions can be presented to the verified entity. The available questions can, for example, correspond to a subset of highest ranked questions directed to the verified entity. In some cases, when a non-verified user accesses the example interface, the element 602 does not need to be provided because, for example, the non-verified user may not have received any questions directed to him or her.

In some embodiments, a viewing user who accesses the interface for asynchronous communications with verified entities can be presented with questions directed to each verified entity in which the viewing user is interested (e.g., following, subscribed to, etc.), as well as any available answers or responses. As shown, there can be a first sub-interface 604 showing one or more questions/responses for a first verified entity (User A) in which the viewing user is interested, as well as a second sub-interface 608 showing one or more questions/responses for a second verified entity (User V) in which the viewing user is interested.

Moreover, in some instances, the viewing user can interact with the questions/responses for each verified entity in which the viewing user is interested. For example, the viewing user can ask a question 606 directed to User A, as well as ask a question 610 directed to User V. In some implementations, it can be determined that a question from the viewing user is substantially the same as, or within a similarity threshold deviation with respect to, another question. In some cases, this can be achieved based on topic tagging, text analysis, etc., applied to the questions. A single question representative of the both questions can be suggested to the viewing user. The viewing user can submit the representative question instead of his or her own question. This can indicate to the verified entity that many users are interested in the representative question.

FIG. 7 illustrates an example screenshot 700 associated with providing communications to and from verified entities, according to an embodiment of the present disclosure. The example screenshot can include an interface 702 for providing questions to a verified entity. In some cases, the interface 702 can be presented to the verified entity when the verified entity clicks or taps on element 602 of FIG. 6. As shown, the interface 702 can provide, present, and/or display one or more questions to the verified entity. In some cases, an indication 704 can be provided to the verified user that there are other questions similar to a currently presented question.

Using element 706, the verified entity can answer or respond to the currently presented question. The verified entity can submit the answer or response to the currently presented question at his or her convenience. Alternatively, the verified entity can decide not to provide an answer or response, but instead skip to the next available question by selecting an option 708 to pass on a currently presented question. Many variations are possible.

Figure 8:
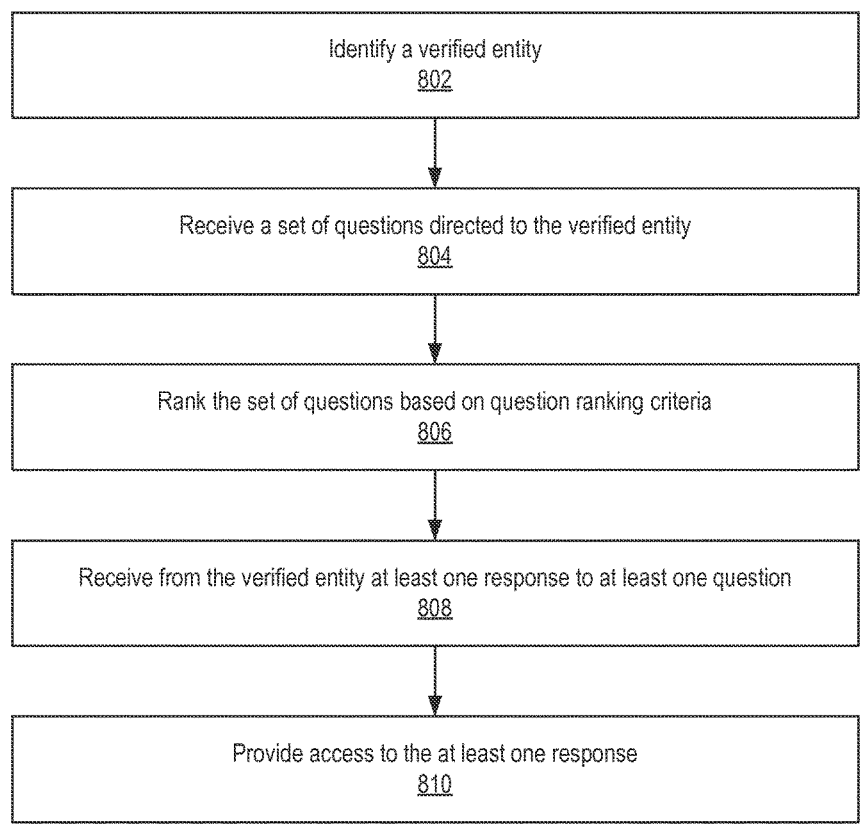
FIG. 8 illustrates an example method associated with providing communications to and from verified entities, according to an embodiment of the present disclosure.

FIG. 8 illustrates an example method 800 associated with providing communications to and from verified entities, according to an embodiment of the present disclosure. It should be appreciated that there can be additional, fewer, or alternative steps performed in similar or alternative orders, or in parallel, within the scope of the various embodiments unless otherwise stated.

At block 802, the example method 800 can identify a verified entity who is verified based on a verification process. At block 804, the example method 800 can receive from a set of question providers a set of questions directed to the verified entity. At block 806, the example method 800 can rank the set of questions based on question ranking criteria. At block 808, the example method 800 can receive from the verified entity at least one response to at least one question in the set of questions. At block 810, the example method 800 can provide access to the at least one response.

In some embodiments, an indication that another verified entity is available can be received from the verified entity. One or more questions directed to the other verified entity can be received. One or more responses to the one or more questions can be received from the other verified entity.

Again, it is contemplated that there can be many other uses, applications, and/or variations associated with the various embodiments of the present disclosure. For example, various embodiments of the present disclosure can learn, improve, and/or be refined over time.

Social Networking System—Example Implementation

Figure 9:
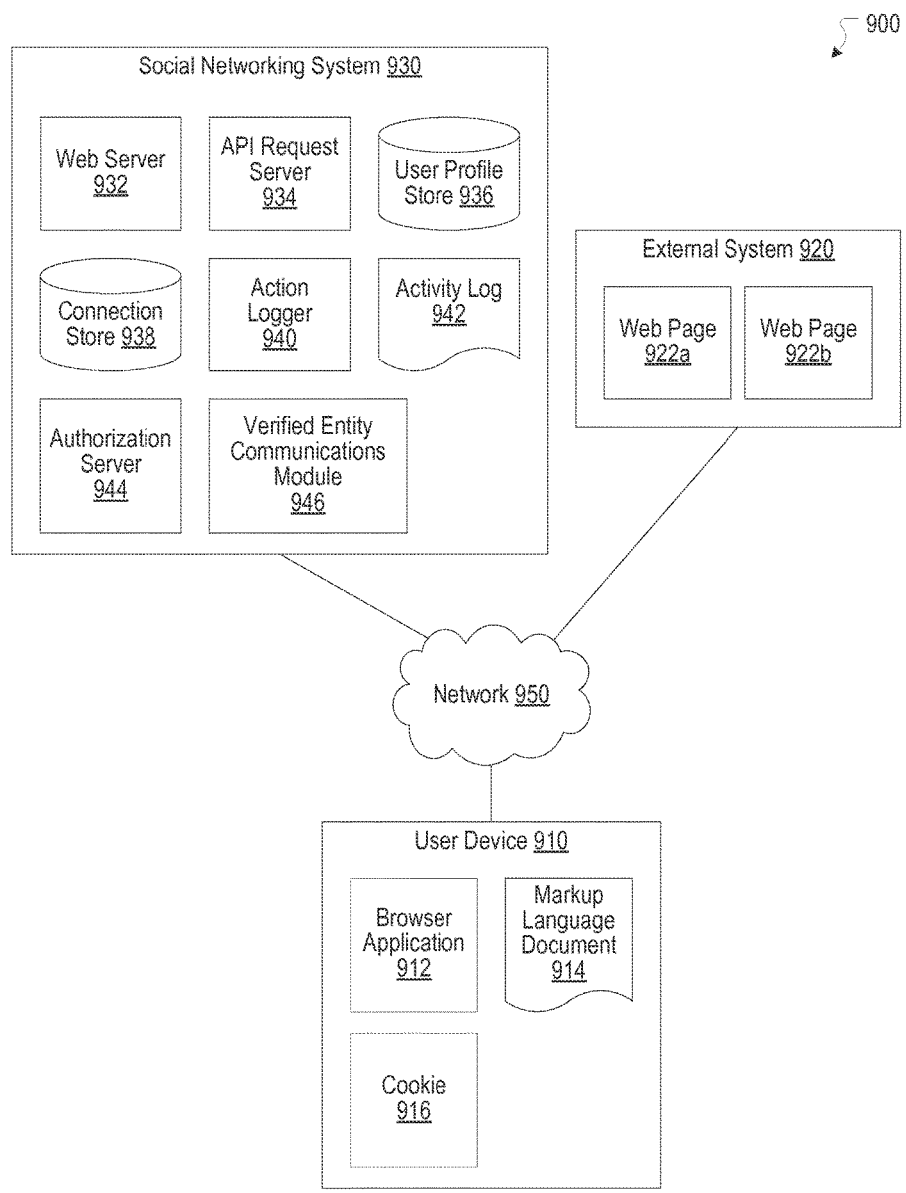
FIG. 9 illustrates a network diagram of an example system that can be utilized in various scenarios, according to an embodiment of the present disclosure.

FIG. 9 illustrates a network diagram of an example system 900 that can be utilized in various embodiments for enhanced video encoding, in accordance with an embodiment of the present disclosure. The system 900 includes one or more user devices 910, one or more external systems 920, a social networking system (or service) 930, and a network 950. In an embodiment, the social networking service, provider, and/or system discussed in connection with the embodiments described above may be implemented as the social networking system 930. For purposes of illustration, the embodiment of the system 900, shown by FIG. 9, includes a single external system 920 and a single user device 910. However, in other embodiments, the system 900 may include more user devices 910 and/or more external systems 920. In certain embodiments, the social networking system 930 is operated by a social network provider, whereas the external systems 920 are separate from the social networking system 930 in that they may be operated by different entities. In various embodiments, however, the social networking system 930 and the external systems 920 operate in conjunction to provide social networking services to users (or members) of the social networking system 930. In this sense, the social networking system 930 provides a platform or backbone, which other systems, such as external systems 920, may use to provide social networking services and functionalities to users across the Internet.

The user device 910 comprises one or more computing devices that can receive input from a user and transmit and receive data via the network 950. In one embodiment, the user device 910 is a conventional computer system executing, for example, a Microsoft Windows compatible operating system (OS), Apple OS X, and/or a Linux distribution. In another embodiment, the user device 910 can be a device having computer functionality, such as a smart-phone, a tablet, a personal digital assistant (PDA), a mobile telephone, etc. The user device 910 is configured to communicate via the network 950. The user device 910 can execute an application, for example, a browser application that allows a user of the user device 910 to interact with the social networking system 930. In another embodiment, the user device 910 interacts with the social networking system 930 through an application programming interface (API) provided by the native operating system of the user device 910, such as iOS and ANDROID. The user device 910 is configured to communicate with the external system 920 and the social networking system 930 via the network 950, which may comprise any combination of local area and/or wide area networks, using wired and/or wireless communication systems.

In one embodiment, the network 950 uses standard communications technologies and protocols. Thus, the network 950 can include links using technologies such as Ethernet, 702.11, worldwide interoperability for microwave access (WiMAX), 3G, 4G, CDMA, GSM, LTE, digital subscriber line (DSL), etc. Similarly, the networking protocols used on the network 950 can include multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and the like. The data exchanged over the network 950 can be represented using technologies and/or formats including hypertext markup language (HTML) and extensible markup language (XML). In addition, all or some links can be encrypted using conventional encryption technologies such as secure sockets layer (SSL), transport layer security (TLS), and Internet Protocol security (IPsec).

In one embodiment, the user device 910 may display content from the external system 920 and/or from the social networking system 930 by processing a markup language document 914 received from the external system 920 and from the social networking system 930 using a browser application 912. The markup language document 914 identifies content and one or more instructions describing formatting or presentation of the content. By executing the instructions included in the markup language document 914, the browser application 912 displays the identified content using the format or presentation described by the markup language document 914. For example, the markup language document 914 includes instructions for generating and displaying a web page having multiple frames that include text and/or image data retrieved from the external system 920 and the social networking system 930. In various embodiments, the markup language document 914 comprises a data file including extensible markup language (XML) data, extensible hypertext markup language (XHTML) data, or other markup language data. Additionally, the markup language document 914 may include JavaScript Object Notation (JSON) data, JSON with padding (JSONP), and JavaScript data to facilitate data-interchange between the external system 920 and the user device 910. The browser application 912 on the user device 910 may use a JavaScript compiler to decode the markup language document 914.

The markup language document 914 may also include, or link to, applications or application frameworks such as FLASH™ or Unity™ applications, the SilverLight™ application framework, etc.

In one embodiment, the user device 910 also includes one or more cookies 916 including data indicating whether a user of the user device 910 is logged into the social networking system 930, which may enable modification of the data communicated from the social networking system 930 to the user device 910.

The external system 920 includes one or more web servers that include one or more web pages 922a, 922b, which are communicated to the user device 910 using the network 950. The external system 920 is separate from the social networking system 930. For example, the external system 920 is associated with a first domain, while the social networking system 930 is associated with a separate social networking domain. Web pages 922a, 922b, included in the external system 920, comprise markup language documents 914 identifying content and including instructions specifying formatting or presentation of the identified content.

The social networking system 930 includes one or more computing devices for a social network, including a plurality of users, and providing users of the social network with the ability to communicate and interact with other users of the social network. In some instances, the social network can be represented by a graph, i.e., a data structure including edges and nodes. Other data structures can also be used to represent the social network, including but not limited to databases, objects, classes, meta elements, files, or any other data structure. The social networking system 930 may be administered, managed, or controlled by an operator. The operator of the social networking system 930 may be a human being, an automated application, or a series of applications for managing content, regulating policies, and collecting usage metrics within the social networking system 930. Any type of operator may be used.

Users may join the social networking system 930 and then add connections to any number of other users of the social networking system 930 to whom they desire to be connected. As used herein, the term "friend" refers to any other user of the social networking system 930 to whom a user has formed a connection, association, or relationship via the social networking system 930. For example, in an embodiment, if users in the social networking system 930 are represented as nodes in the social graph, the term "friend" can refer to an edge formed between and directly connecting two user nodes.

Connections may be added explicitly by a user or may be automatically created by the social networking system 930 based on common characteristics of the users (e.g., users who are alumni of the same educational institution). For example, a first user specifically selects a particular other user to be a friend. Connections in the social networking system 930 are usually in both directions, but need not be, so the terms "user" and "friend" depend on the frame of reference. Connections between users of the social networking system 930 are usually bilateral ("two-way"), or "mutual," but connections may also be unilateral, or "one-way." For example, if Bob and Joe are both users of the social networking system 930 and connected to each other, Bob and Joe are each other's connections. If, on the other hand, Bob wishes to connect to Joe to view data communicated to the social networking system 930 by Joe, but Joe does not wish to form a mutual connection, a unilateral connection may be established. The connection between users may be a direct connection; however, some embodiments of the social networking system 930 allow the connection to be indirect via one or more levels of connections or degrees of separation.

In addition to establishing and maintaining connections between users and allowing interactions between users, the social networking system 930 provides users with the ability to take actions on various types of items supported by the social networking system 930. These items may include groups or networks (i.e., social networks of people, entities, and concepts) to which users of the social networking system 930 may belong, events or calendar entries in which a user might be interested, computer-based applications that a user may use via the social networking system 930, transactions that allow users to buy or sell items via services provided by or through the social networking system 930, and interactions with advertisements that a user may perform on or off the social networking system 930. These are just a few examples of the items upon which a user may act on the social networking system 930, and many others are possible. A user may interact with anything that is capable of being represented in the social networking system 930 or in the external system 920, separate from the social networking system 930, or coupled to the social networking system 930 via the network 950.

The social networking system 930 is also capable of linking a variety of entities. For example, the social networking system 930 enables users to interact with each other as well as external systems 920 or other entities through an API, a web service, or other communication channels. The social networking system 930 generates and maintains the "social graph" comprising a plurality of nodes interconnected by a plurality of edges. Each node in the social graph may represent an entity that can act on another node and/or that can be acted on by another node. The social graph may include various types of nodes. Examples of types of nodes include users, non-person entities, content items, web pages, groups, activities, messages, concepts, and any other things that can be represented by an object in the social networking system 930. An edge between two nodes in the social graph may represent a particular kind of connection, or association, between the two nodes, which may result from node relationships or from an action that was performed by one of the nodes on the other node. In some cases, the edges between nodes can be weighted. The weight of an edge can represent an attribute associated with the edge, such as a strength of the connection or association between nodes. Different types of edges can be provided with different weights. For example, an edge created when one user "likes" another user may be given one weight, while an edge created when a user befriends another user may be given a different weight.

As an example, when a first user identifies a second user as a friend, an edge in the social graph is generated connecting a node representing the first user and a second node representing the second user. As various nodes relate or interact with each other, the social networking system 930 modifies edges connecting the various nodes to reflect the relationships and interactions.

The social networking system 930 also includes user-generated content, which enhances a user's interactions with the social networking system 930. User-generated content may include anything a user can add, upload, send, or "post" to the social networking system 930. For example, a user communicates posts to the social networking system 930 from a user device 910. Posts may include data such as status updates or other textual data, location information, images such as photos, videos, links, music or other similar data and/or media. Content may also be added to the social networking system 930 by a third party. Content "items" are represented as objects in the social networking system 930. In this way, users of the social networking system 930 are encouraged to communicate with each other by posting text and content items of various types of media through various communication channels. Such communication increases the interaction of users with each other and increases the frequency with which users interact with the social networking system 930.

The social networking system 930 includes a web server 932, an API request server 934, a user profile store 936, a connection store 938, an action logger 940, an activity log 942, and an authorization server 944. In an embodiment of the invention, the social networking system 930 may include additional, fewer, or different components for various applications. Other components, such as network interfaces, security mechanisms, load balancers, failover servers, management and network operations consoles, and the like are not shown so as to not obscure the details of the system.

The user profile store 936 maintains information about user accounts, including biographic, demographic, and other types of descriptive information, such as work experience, educational history, hobbies or preferences, location, and the like that has been declared by users or inferred by the social networking system 930. This information is stored in the user profile store 936 such that each user is uniquely identified. The social networking system 930 also stores data describing one or more connections between different users in the connection store 938. The connection information may indicate users who have similar or common work experience, group memberships, hobbies, or educational history. Additionally, the social networking system 930 includes user-defined connections between different users, allowing users to specify their relationships with other users. For example, user-defined connections allow users to generate relationships with other users that parallel the users' real-life relationships, such as friends, co-workers, partners, and so forth. Users may select from predefined types of connections, or define their own connection types as needed. Connections with other nodes in the social networking system 930, such as non-person entities, buckets, cluster centers, images, interests, pages, external systems, concepts, and the like are also stored in the connection store 938.

The social networking system 930 maintains data about objects with which a user may interact. To maintain this data, the user profile store 936 and the connection store 938 store instances of the corresponding type of objects maintained by the social networking system 930. Each object type has information fields that are suitable for storing information appropriate to the type of object. For example, the user profile store 936 contains data structures with fields suitable for describing a user's account and information related to a user's account. When a new object of a particular type is created, the social networking system 930 initializes a new data structure of the corresponding type, assigns a unique object identifier to it, and begins to add data to the object as needed. This might occur, for example, when a user becomes a user of the social networking system 930, the social networking system 930 generates a new instance of a user profile in the user profile store 936, assigns a unique identifier to the user account, and begins to populate the fields of the user account with information provided by the user.

The connection store 938 includes data structures suitable for describing a user's connections to other users, connections to external systems 920 or connections to other entities. The connection store 938 may also associate a connection type with a user's connections, which may be used in conjunction with the user's privacy setting to regulate access to information about the user. In an embodiment of the invention, the user profile store 936 and the connection store 938 may be implemented as a federated database.

Data stored in the connection store 938, the user profile store 936, and the activity log 942 enables the social networking system 930 to generate the social graph that uses nodes to identify various objects and edges connecting nodes to identify relationships between different objects. For example, if a first user establishes a connection with a second user in the social networking system 930, user accounts of the first user and the second user from the user profile store 936 may act as nodes in the social graph. The connection between the first user and the second user stored by the connection store 938 is an edge between the nodes associated with the first user and the second user. Continuing this example, the second user may then send the first user a message within the social networking system 930. The action of sending the message, which may be stored, is another edge between the two nodes in the social graph representing the first user and the second user. Additionally, the message itself may be identified and included in the social graph as another node connected to the nodes representing the first user and the second user.

In another example, a first user may tag a second user in an image that is maintained by the social networking system 930 (or, alternatively, in an image maintained by another system outside of the social networking system 930). The image may itself be represented as a node in the social networking system 930. This tagging action may create edges between the first user and the second user as well as create an edge between each of the users and the image, which is also a node in the social graph. In yet another example, if a user confirms attending an event, the user and the event are nodes obtained from the user profile store 936, where the attendance of the event is an edge between the nodes that may be retrieved from the activity log 942. By generating and maintaining the social graph, the social networking system 930 includes data describing many different types of objects and the interactions and connections among those objects, providing a rich source of socially relevant information.

The web server 932 links the social networking system 930 to one or more user devices 910 and/or one or more external systems 920 via the network 950. The web server 932 serves web pages, as well as other web-related content, such as Java, JavaScript, Flash, XML, and so forth. The web server 932 may include a mail server or other messaging functionality for receiving and routing messages between the social networking system 930 and one or more user devices 910. The messages can be instant messages, queued messages (e.g., email), text and SMS messages, or any other suitable messaging format.

The API request server 934 allows one or more external systems 920 and user devices 910 to call access information from the social networking system 930 by calling one or more API functions. The API request server 934 may also allow external systems 920 to send information to the social networking system 930 by calling APIs. The external system 920, in one embodiment, sends an API request to the social networking system 930 via the network 950, and the API request server 934 receives the API request. The API request server 934 processes the request by calling an API associated with the API request to generate an appropriate response, which the API request server 934 communicates to the external system 920 via the network 950. For example, responsive to an API request, the API request server 934 collects data associated with a user, such as the user's connections that have logged into the external system 920, and communicates the collected data to the external system 920. In another embodiment, the user device 910 communicates with the social networking system 930 via APIs in the same manner as external systems 920.

The action logger 940 is capable of receiving communications from the web server 932 about user actions on and/or off the social networking system 930. The action logger 940 populates the activity log 942 with information about user actions, enabling the social networking system 930 to discover various actions taken by its users within the social networking system 930 and outside of the social networking system 930. Any action that a particular user takes with respect to another node on the social networking system 930 may be associated with each user's account, through information maintained in the activity log 942 or in a similar database or other data repository. Examples of actions taken by a user within the social networking system 930 that are identified and stored may include, for example, adding a connection to another user, sending a message to another user, reading a message from another user, viewing content associated with another user, attending an event posted by another user, posting an image, attempting to post an image, or other actions interacting with another user or another object. When a user takes an action within the social networking system 930, the action is recorded in the activity log 942. In one embodiment, the social networking system 930 maintains the activity log 942 as a database of entries. When an action is taken within the social networking system 930, an entry for the action is added to the activity log 942. The activity log 942 may be referred to as an action log.

Additionally, user actions may be associated with concepts and actions that occur within an entity outside of the social networking system 930, such as an external system 920 that is separate from the social networking system 930. For example, the action logger 940 may receive data describing a user's interaction with an external system 920 from the web server 932. In this example, the external system 920 reports a user's interaction according to structured actions and objects in the social graph.

Other examples of actions where a user interacts with an external system 920 include a user expressing an interest in an external system 920 or another entity, a user posting a comment to the social networking system 930 that discusses an external system 920 or a web page 922*a* within the external system 920, a user posting to the social networking system 930 a Uniform Resource Locator (URL) or other identifier associated with an external system 920, a user attending an event associated with an external system 920, or any other action by a user that is related to an external system 920. Thus, the activity log 942 may include actions describing interactions between a user of the social networking system 930 and an external system 920 that is separate from the social networking system 930.

The authorization server 944 enforces one or more privacy settings of the users of the social networking system 930. A privacy setting of a user determines how particular information associated with a user can be shared. The privacy setting comprises the specification of particular information associated with a user and the specification of the entity or entities with whom the information can be shared. Examples of entities with which information can be shared may include other users, applications, external systems 920, or any entity that can potentially access the information. The information that can be shared by a user comprises user account information, such as profile photos, phone numbers associated with the user, user's connections, actions taken by the user such as adding a connection, changing user profile information, and the like.

The privacy setting specification may be provided at different levels of granularity. For example, the privacy setting may identify specific information to be shared with other users; the privacy setting identifies a work phone number or a specific set of related information, such as, personal information including profile photo, home phone number, and status. Alternatively, the privacy setting may apply to all the information associated with the user. The specification of the set of entities that can access particular information can also be specified at various levels of granularity. Various sets of entities with which information can be shared may include, for example, all friends of the user, all friends of friends, all applications, or all external systems 920. One embodiment allows the specification of the set of entities to comprise an enumeration of entities. For example, the user may provide a list of external systems 920 that are allowed to access certain information. Another embodiment allows the specification to comprise a set of entities along with exceptions that are not allowed to access the information. For example, a user may allow all external systems 920 to access the user's work information, but specify a list of external systems 920 that are not allowed to access the work information. Certain embodiments call the list of exceptions that are not allowed to access certain information a "block list". External systems 920 belonging to a block list specified by a user are blocked from accessing the information specified in the privacy setting. Various combinations of granularity of specification of information, and granularity of specification of entities, with which information is shared are possible. For example, all personal information may be shared with friends whereas all work information may be shared with friends of friends.

The authorization server 944 contains logic to determine if certain information associated with a user can be accessed by a user's friends, external systems 920, and/or other applications and entities. The external system 920 may need authorization from the authorization server 944 to access the user's more private and sensitive information, such as the user's work phone number. Based on the user's privacy settings, the authorization server 944 determines if another user, the external system 920, an application, or another entity is allowed to access information associated with the user, including information about actions taken by the user.

In some embodiments, the social networking system 930 can include a verified entity communications module 946. The verified entity communications module 946 can, for example, be implemented as the verified entity communications module 102 of FIG. 1. The verified entity communications module 946 can be configured to identify a verified entity who is verified based on a verification process. The verified entity communications module 946 can be configured to receive from a set of question providers a set of questions directed to the verified entity. Further, the verified entity communications module 946 can be configured to rank the set of questions based on question ranking criteria. The verified entity communications module 946 can also be configured to receive from the verified entity at least one response to at least one question in the set of questions. Moreover, the verified entity communications module 946 can be configured to provide access to the at least one response. Other features of the verified entity communications module 946 are discussed herein in connection with the verified entity communications module 102.

Hardware Implementation

Figure 10:
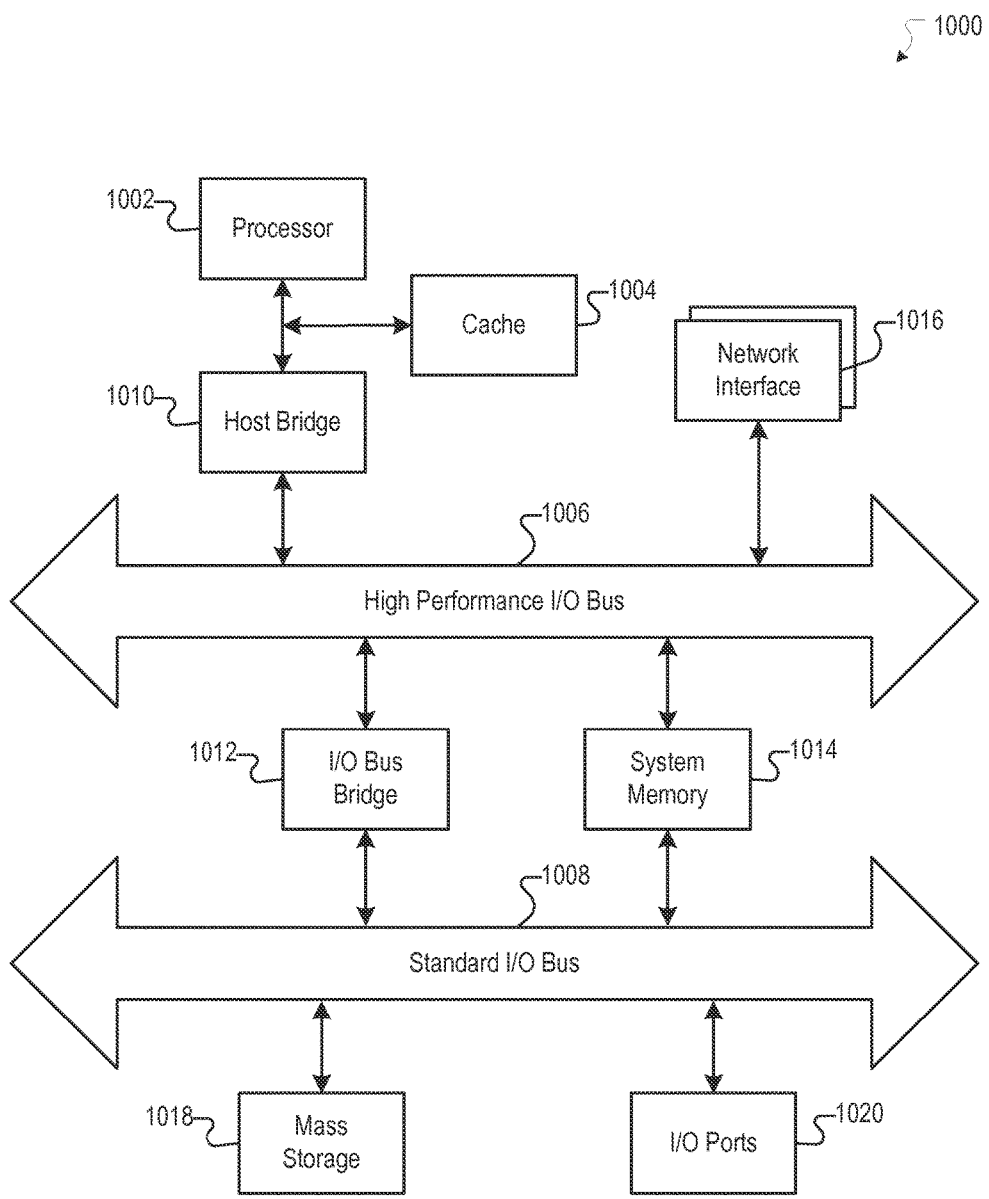
FIG. 10 illustrates an example of a computer system that can be utilized in various scenarios, according to an embodiment of the present disclosure.

The foregoing processes and features can be implemented by a wide variety of machine and computer system architectures and in a wide variety of network and computing environments. FIG. 10 illustrates an example of a computer system 1000 that may be used to implement one or more of the embodiments described herein in accordance with an embodiment of the invention. The computer system 1000 includes sets of instructions for causing the computer system 1000 to perform the processes and features discussed herein. The computer system 1000 may be connected (e.g., networked) to other machines. In a networked deployment, the computer system 1000 may operate in the capacity of a server machine or a client machine in a client-server network environment, or as a peer machine in a peer-to-peer (or distributed) network environment. In an embodiment of the invention, the computer system 1000 may be the social networking system 1030, the user device 910, and the external system 1020, or a component thereof. In an embodiment of the invention, the computer system 1000 may be one server among many that constitutes all or part of the social networking system 1030.

The computer system 1000 includes a processor 1002, a cache 1004, and one or more executable modules and drivers, stored on a computer-readable medium, directed to the processes and features described herein. Additionally, the computer system 1000 includes a high performance input/output (I/O) bus 1006 and a standard I/O bus 1008. A host bridge 1010 couples processor 1002 to high performance I/O bus 1006, whereas I/O bus bridge 1012 couples the two buses 1006 and 1008 to each other. A system memory 1014 and one or more network interfaces 1016 couple to high performance I/O bus 1006. The computer system 1000 may further include video memory and a display device coupled to the video memory (not shown). Mass storage 1018 and I/O ports 1020 couple to the standard I/O bus 1008. The computer system 1000 may optionally include a keyboard and pointing device, a display device, or other input/output devices (not shown) coupled to the standard I/O bus 1008. Collectively, these elements are intended to represent a broad category of computer hardware systems, including but not limited to computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

An operating system manages and controls the operation of the computer system 1000, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Other implementations are possible.

The elements of the computer system 1000 are described in greater detail below. In particular, the network interface 1016 provides communication between the computer system 1000 and any of a wide range of networks, such as an Ethernet (e.g., IEEE 802.3) network, a backplane, etc. The mass storage 1018 provides permanent storage for the data and programming instructions to perform the above-described processes and features implemented by the respective computing systems identified above, whereas the system memory 1014 (e.g., DRAM) provides temporary storage for the data and programming instructions when executed by the processor 1002. The I/O ports 1020 may be one or more serial and/or parallel communication ports that provide communication between additional peripheral devices, which may be coupled to the computer system 1000.

The computer system 1000 may include a variety of system architectures, and various components of the computer system 1000 may be rearranged. For example, the cache 1004 may be on-chip with processor 1002. Alternatively, the cache 1004 and the processor 1002 may be packed together as a "processor module", with processor 1002 being referred to as the "processor core". Furthermore, certain embodiments of the invention may neither require nor include all of the above components. For example, peripheral devices coupled to the standard I/O bus 1008 may couple to the high performance I/O bus 1006. In addition, in some embodiments, only a single bus may exist, with the components of the computer system 1000 being coupled to the single bus. Moreover, the computer system 1000 may include additional components, such as additional processors, storage devices, or memories.

In general, the processes and features described herein may be implemented as part of an operating system or a specific application, component, program, object, module, or series of instructions referred to as "programs". For example, one or more programs may be used to execute specific processes described herein. The programs typically comprise one or more instructions in various memory and storage devices in the computer system 1000 that, when read and executed by one or more processors, cause the computer system 1000 to perform operations to execute the processes and features described herein. The processes and features described herein may be implemented in software, firmware, hardware (e.g., an application specific integrated circuit), or any combination thereof.

In one implementation, the processes and features described herein are implemented as a series of executable modules run by the computer system 1000, individually or collectively in a distributed computing environment. The foregoing modules may be realized by hardware, executable modules stored on a computer-readable medium (or machine-readable medium), or a combination of both. For example, the modules may comprise a plurality or series of instructions to be executed by a processor in a hardware system, such as the processor 1002. Initially, the series of instructions may be stored on a storage device, such as the mass storage 1018. However, the series of instructions can be stored on any suitable computer readable storage medium. Furthermore, the series of instructions need not be stored locally, and could be received from a remote storage device, such as a server on a network, via the network interface 1016. The instructions are copied from the storage device, such as the mass storage 1018, into the system memory 1014 and then accessed and executed by the processor 1002. In various implementations, a module or modules can be executed by a processor or multiple processors in one or multiple locations, such as multiple servers in a parallel processing environment.

Examples of computer-readable media include, but are not limited to, recordable type media such as volatile and non-volatile memory devices; solid state memories; floppy and other removable disks; hard disk drives; magnetic media; optical disks (e.g., Compact Disk Read-Only Memory (CD ROMS), Digital Versatile Disks (DVDs)); other similar non-transitory (or transitory), tangible (or non-tangible) storage medium; or any type of medium suitable for storing, encoding, or carrying a series of instructions for execution by the computer system 1000 to perform any one or more of the processes and features described herein.

For purposes of explanation, numerous specific details are set forth in order to provide a thorough understanding of the description. It will be apparent, however, to one skilled in the art that embodiments of the disclosure can be practiced without these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein.

Reference in this specification to "one embodiment", "an embodiment", "other embodiments", "one series of embodiments", "some embodiments", "various embodiments", or the like means that a particular feature, design, structure, or characteristic described in connection with the embodiment is included in at least one embodiment of the disclosure. The appearances of, for example, the phrase "in one embodiment" or "in an embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments, but also variously omitted in other embodiments. Similarly, various features are described that may be preferences or requirements for some embodiments, but not other embodiments.

The language used herein has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:
   identifying, by a computing system, a verified entity based on a verification process;
   receiving, by the computing system, from a set of question providers a set of questions directed to the verified entity after the verified entity has been verified based on the verification process;
   ranking, by the computing system, the set of questions directed to the verified entity based on question ranking criteria, wherein the ranking comprises:
   acquiring a popularity metric for each respective question in the set of questions, and
   increasing a rank for the respective question when the popularity metric satisfies a specified popularity threshold level, wherein the popularity metric is based on at least one of an amount of likes for the respective question, an amount of up-votes for the respective question, an amount of shares for the respective question, an amount of hides for the respective question, or an amount of down-votes for the respective question in a social networking system;
   personalizing the ranking for a viewing user, different from the verified entity, based on data of a social graph associated with the viewing user, wherein at least one question in the set of questions from a social connection of the viewing user is presented to the viewing user with higher priority than at least one other question in the set of questions from a user who is not or, compared to the social connection, is less socially connected with the viewing user;
   receiving, by the computing system, from the verified entity at least one response to at least one question in the set of questions after the verified entity has been verified based on the verification process; and
   providing, by the computing system, access to the at least one response in the social networking system.

2. The computer-implemented method of claim 1, wherein the ranking of the set of questions based on the question ranking criteria further comprises:
   acquiring a property for each respective question provider in the set of question providers, wherein the property indicates at least one of a reputation metric of the respective question provider or a verified entity status of the respective question provider; and
   increasing a rank for a respective question, in the set of questions, received from the respective question provider when at least one of 1) the reputation metric satisfies a specified reputation threshold level or 2) the verified entity status indicates that the respective question provider is verified based on the verification process.

3. The computer-implemented method of claim 1, wherein the ranking of the set of questions based on the question ranking criteria further comprises:
   acquiring time data associated with each respective question in the set of questions; and
   increasing a rank for the respective question when the time data associated with the respective question indicates that the respective question is received within an allowable time frame.

4. The computer-implemented method of claim 1, wherein the at least one response from the verified entity is received as part of a set of responses, and wherein the set of responses is ranked.

5. The computer-implemented method of claim 4, wherein the ranking of the set of questions based on the question ranking criteria includes boosting a rank for a particular question in the set of questions over at least one other question in the set when the particular question is received from a particular question provider who is verified based on the verification process and the at least one other question is received from a non-verified question provider, and wherein a rank for the at least one response from the verified entity is boosted over at least one other response from a non-verified responder.

6. The computer-implemented method of claim 1, wherein at least one of the set of questions or the at least one response is presented to the viewing user.

7. The computer-implemented method of claim 1, further comprising:
   initiating a real-time question-and-answer session prior to the receiving of the set of questions, wherein the set of questions and the at least one response are presentable in association with the question-and-answer session.

8. The computer-implemented method of claim 7, wherein a presentation of the set of questions and the at least one response persists over time.

9. The computer-implemented method of claim 7, wherein the question-and-answer session corresponds to at least one of a story within a social networking system or a post within the social networking system.

10. The computer-implemented method of claim 7, wherein the question-and-answer session is initiated by at least one of a host or the verified entity.

11. The computer-implemented method of claim 10, wherein the ranking of the set of questions based on the question ranking criteria includes boosting a rank for a particular question in the set of questions over at least one other question in the set when the particular question is received from the host and the at least one other question is received from a non-host question provider.

12. The computer-implemented method of claim 1, further comprising:
receiving an indication from the verified entity that another verified entity is available;
receiving one or more questions directed to the other verified entity; and
receiving from the other verified entity one or more responses to the one or more questions.

13. The computer-implemented method of claim 1, wherein the verified entity is associated with at least one of a public figure, a brand, a company, or an organization.

14. The computer-implemented method of claim 1, further comprising:
providing a subset of questions, out of the set of questions, to the verified entity subsequent to the ranking of the set of questions, wherein each question in the subset satisfies a specified ranking threshold level, and wherein the subset includes the at least one question.

15. The computer-implemented method of claim 1, wherein the receiving of the set of questions occurs asynchronously from the receiving of the at least one response.

16. The computer-implemented method of claim 1, further comprising:
determining that a first question in the set of questions is within a similarity threshold deviation with respect to a second question in the set of questions; and
providing, to the verified entity, a single question representative of the first question and the second question.

17. A system comprising: at least one processor; and a memory storing instructions that, when executed by the at least one processor, cause the system to perform:
identifying a verified entity based on a verification process;
receiving from a set of question providers a set of questions directed to the verified entity after the verified entity has been verified based on the verification process;
ranking the set of questions directed to the verified entity based on question ranking criteria, wherein the ranking comprises:
acquiring a popularity metric for each respective question in the set of questions,
increasing a rank for the respective question when the popularity metric satisfies a specified popularity threshold level, wherein the popularity metric is based on at least one of an amount of likes for the respective question, an amount of up-votes for the respective question, an amount of shares for the respective question, an amount of hides for the respective question, or an amount of down-votes for the respective question in a social networking system, and
personalizing the ranking for a viewing user, different from the verified entity, based on data of a social graph associated with the viewing user, wherein at least one question in the set of questions from a social connection of the viewing user is presented to the viewing user with higher priority than at least one other question in the set of questions from a user who is not or, compared to the social connection, is less socially connected with the viewing user;
receiving from the verified entity at least one response to at least one question in the set of questions after the verified entity has been verified based on the verification process; and
providing access to the at least one response in a social networking system.

18. A non-transitory computer-readable storage medium including instructions that, when executed by at least one processor of a computing system, cause the computing system to perform:
identifying a verified entity based on a verification process;
receiving from a set of question providers a set of questions directed to the verified entity after the verified entity has been verified based on the verification process;
ranking the set of questions directed to the verified entity based on question ranking criteria, wherein the ranking comprises:
acquiring a popularity metric for each respective question in the set of questions,
increasing a rank for the respective question when the popularity metric satisfies a specified popularity threshold level, wherein the popularity metric is based on at least one of an amount of likes for the respective question, an amount of up-votes for the respective question, an amount of shares for the respective question, an amount of hides for the respective question, or an amount of down-votes for the respective question in a social networking system, and
personalizing the ranking for a viewing user, different from the verified entity, based on data of a social graph associated with the viewing user, wherein at least one question in the set of questions from a social connection of the viewing user is presented to the viewing user with higher priority than at least one other question in the set of questions from a user who is not or, compared to the social connection, is less socially connected with the viewing user;
receiving from the verified entity at least one response to at least one question in the set of questions after the verified entity has been verified based on the verification process; and
providing access to the at least one response in the social networking system.

* * * * *